United States Patent [19]
Smith

[11] 4,149,234
[45] Apr. 10, 1979

[54] INVERTER ARRANGEMENTS

[75] Inventor: John P. Smith, Chelmsford, England

[73] Assignee: English Electric Valve Company Limited, Chelmsford, England

[21] Appl. No.: 877,715

[22] Filed: Feb. 14, 1978

[51] Int. Cl.$^2$ .......................................... H02M 7/537
[52] U.S. Cl. ..................................... 363/133; 331/114
[58] Field of Search ............... 331/113 R, 113 A, 114; 363/22-25, 131, 133, 134

[56] References Cited

U.S. PATENT DOCUMENTS

| | | | |
|---|---|---|---|
| 2,849,673 | 8/1958 | Hubbard | 331/113 A |
| 2,968,738 | 1/1961 | Pintell | 331/113 A |
| 3,207,972 | 9/1965 | Love | 363/131 |
| 3,219,907 | 11/1965 | Josephson | 331/113 A |
| 3,243,725 | 3/1966 | Raposa et al. | 331/113 A |
| 3,612,909 | 10/1971 | Imabayashi | 363/134 X |
| 3,617,857 | 11/1971 | Gunderson | 363/133 X |
| 3,946,301 | 3/1976 | Love | 363/134 X |

Primary Examiner—William M. Shoop
Attorney, Agent, or Firm—Diller, Ramik & Wight

[57] ABSTRACT

This invention provides an inverter circuit in which an output transformer has a tapped primary winding, one portion of which provides a collector load for a first transistor and the other portion of which provides a collector load for a second transistor, with a saturating transformer arranged to provide oscillatory positive feedback from the collectors to the bases of the transistors. The feedback paths from the saturating transformer to the bases of the transistors each includes the base/emitter path of a respective additional transistor and current is supplied to the collectors of the additional transistors in order to maintain operation during saturation.

7 Claims, 5 Drawing Figures

INVERTER ARRANGEMENTS

This invention relates to inverter arrangements.

Figure 1:
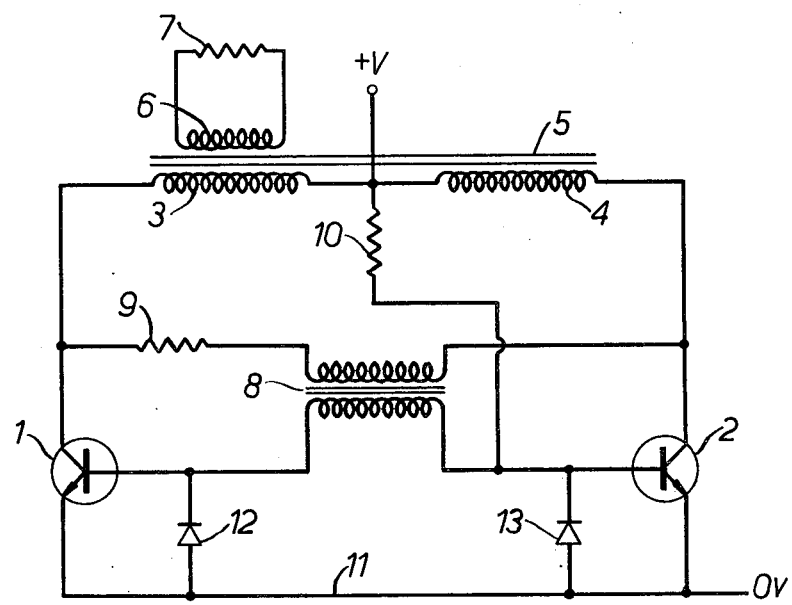

A typical, known, inverter arrangement is illustrated in the circuit diagram of FIG. 1 of the accompanying drawings.

The circuit diagrams of FIGS. 2 to 5, illustrate different inverter arrangements in accordance with the present invention.

Referring to FIG. 1, two transistors 1 and 2 are arranged with collector loads 3 and 4 respectively formed by the two halves of a centre tapped primary winding of a transformer 5. The secondary winding 6 of the transformer 5 supplies a load 7.

A saturating transformer 8 is connected to provide positive feedback to the bases of transistors 1 and 2 whereby oscillations are set up.

A resistor 9 is provided to control the saturation current of transformer 8 and a resistor 10 is connected to provide direct current to the bases of transistors 1 and 2 (via the secondary winding of transformer 8) so that one or other of these will be forced on when the whole arrangment is switched on, so as to ensure that oscillations commence.

The emitter electrodes of transistors 1 and 2 are connected to the common potential rail 11 and diode rectifiers 12 and 13, polarised as shown, are connected between the bases of transistors 1 and 2 respectively and the common potential rail 11 to enable current to flow through the winding of transformer 8.

Whilst the known inverter circuit described above operates satisfactorily at relatively low power levels, the circuit is inadequate when relatively high power outputs (of greater than 100 W say) are required into the load. The reason for this is that the transistors 1 and 2 are power transistors and when saturated at a high collector current, their direct current gains, $H_{FE}$, are low. This results in high base currents which have to be supplied by the feedback transformer 8 to maintain occillations.

However, the saturating transformer 8 controls the frequency of operation by virtue of the time taken to saturate. This varies with the load thereon since the current supplied to the bases of the transistors 1 and 2 by the transformer 8 is added to the saturation current through the primary, increasing the voltage drop across resistor 9, resulting in a lower voltage across the primary winding of transformer 8, and thus reducing the resulting rate of change of current. Consequently the time taken to saturate is increased. Thus the operating frequency decreases. This fall in operating frequency tends to lead to the main transformer 5 saturating with resulting high current and possible device failure. Alternatively the magnetising current in transformer 5 may rise to a value such that efficiency is reduced to an unacceptable extent.

The present invention seeks to provide an improved inverter arrangement in which the above difficulty is reduced.

According to this invention an inverter arrangement comprising an output transformer having a tapped primary winding, one portion of which provides a collector load for a first transistor and the other portion of which provides the collector load with a second transistor and a saturating transformer is arranged to provide oscillatory positive feedback from the collectors to the bases of said first and second transistors is provided, wherein the feedback paths from said saturating transformer to said bases each includes the base emitter path of a respective additional transistor, means being provided for supplying current to the collectors of the additional transistors, whereby to maintain operation during saturation.

Said last mentioned means may comprise a resistive path from the collector of each additional transistor to a voltage supply point.

Preferably however, said last mentioned means comprises means for inductively coupling the collector electrodes of said two additional transistors to said output transformer.

In this last mentioned case, said inductive coupling means may comprise means for connecting a tapping point on the respective portion of the primary winding of said output transformer to the collector electrode of the respective additional transistor.

Said inductive coupling means may alternatively comprise two auxiliary windings, one coupled to one portion of the primary winding of the output transformer and the other coupled to the other, each auxiliary winding being coupled at one end to the other and at the other end to the collector of a respective one of the auxiliary transistors.

Preferably, however, said inductive coupling means comprises a single auxiliary winding coupled to the primary winding of said output transformer, one end of said auxiliary winding being connected to the collector of one of the auxiliary transistors and the other end of said auxiliary winding being connected to the collector electrode of the other of said additional transistors, the collectors electrodes of said additional transistors being referenced to common potential by means of suitably poled unilaterally conductive devices and the whole arrangement being such that during saturation aid auxiliary winding provides just sufficient voltage to cause just sufficient current to flow as is necessary to drive said additional transistors.

In all cases said first and second transistors may be replaced by parallel connected pairs of transistors.

The invention is further described with reference to FIGS. 2 to 5 of the accompanying drawings each of which is the circuit diagram of a different inverter arrangement in accordance with the present invention.

In all of the Figures, including FIG. 1 already described, like references are used for like parts.

Figure 2:
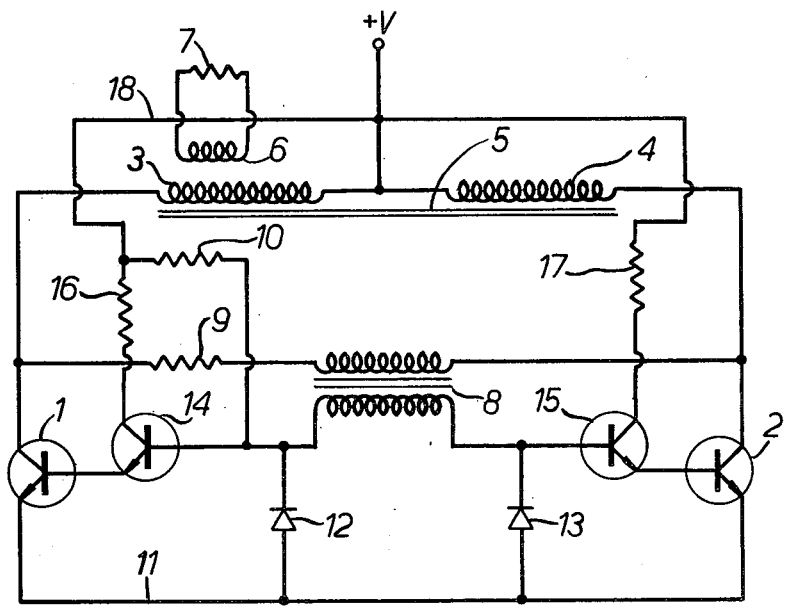

Referring to FIG. 2, it will be seen that the difference between this circuit arrangement and that of FIG. 1 consists essentially of the provision of additional transistors 14 and 15 and resistors 16 and 17. Transistors 14 and 15 are arranged with their base to emitter paths in the feedback paths from the secondary of saturated transformer 8 to the base of the transistors 1 and 2.

The emitter electrode of transistor 14 is connected to the base electrode of transistor 1 and the emitter electrode of transistor 15 is connected to the base of transistor 2, so that the transistors 1 and 14 form one Darlington pair, whilst the transistors 2 and 15 also form a Darlington pair. The collector electrode of transistor 14 is connected via resistor 16 to the positive rail 18. Similarly, the emitter of transistor 15 is connected via resistor 17 to the positive rail 18.

With the circuit arrangment of FIG. 2, the d.c. current gain, $H_{FE}$, of each Darlington pair of transistors 1, 14 and 2, 15 is the product of the individual elements. This results in a very much reduced base drive requirement to be supplied by transformer 8. When transistor 1 or 2 saturates, the collector voltage of transistor 14 or 15 (as the case may be), tends to reduce below this base voltage. In the absence of the means, in this case resistor 16 or 17, for supplying current to the collector electrode of transistor 14 or 15, these last mentioned transistors would be prevented from operating. With the would be circuit arrangement shown however each Darlington pair 1, 14 and 2, 15 are enabled to continue to operate effectively during saturation by virtue of being supplied with current via resistors 16 and 17.

Figure 3:
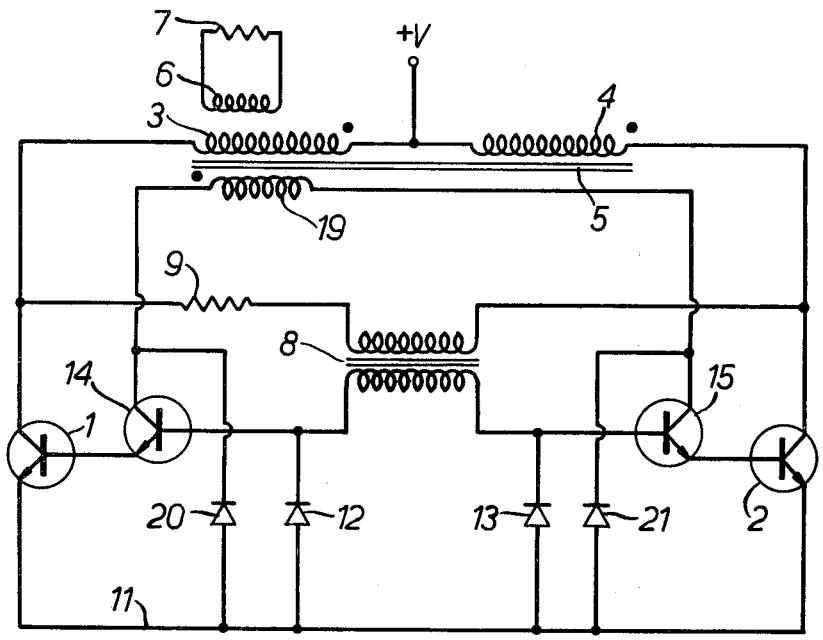

The arrangement described with reference to FIG. 2 has th disadvantage that $I^2R$ losses in the resistors 16 and 17 tends to reduce efficiency and for this reason the inverter arrangement now to be described with reference to FIG. 3 is preferred.

Referring to FIG. 3, it will be seen that, compared with FIG. 2, the resistors 16 and 17 are dispensed with and the collectors of transistors 14 and 15 are connected to either end of an auxiliary winding 19 at transformer 5. In addition, the collector electrodes of transistors 14 and 15 are referenced to the common potential rail 11 by means of suitably polarised diode rectifiers 20 and 21, the whole arrangment being such that an energising voltage, which is just sufficient (say 2 volts) to operate the transistors 14 and 15 is supplied by the auxiliary winding 19. The objject is to provide just sufficient current to drive the transistors with minimal power loss.

Auxiliary winding 19 must be connected in a manner such as to provide correct phasing so that when transistor 1 is saturated the collector of transistor 14 is driven high and correspondingly when transistor 2 is saturated the collector of transistor 15 is driven high. The showing of black dots on the ends of the windings 3, 4 and 19 conventionally denote ends of the time polarity.

Figure 4:
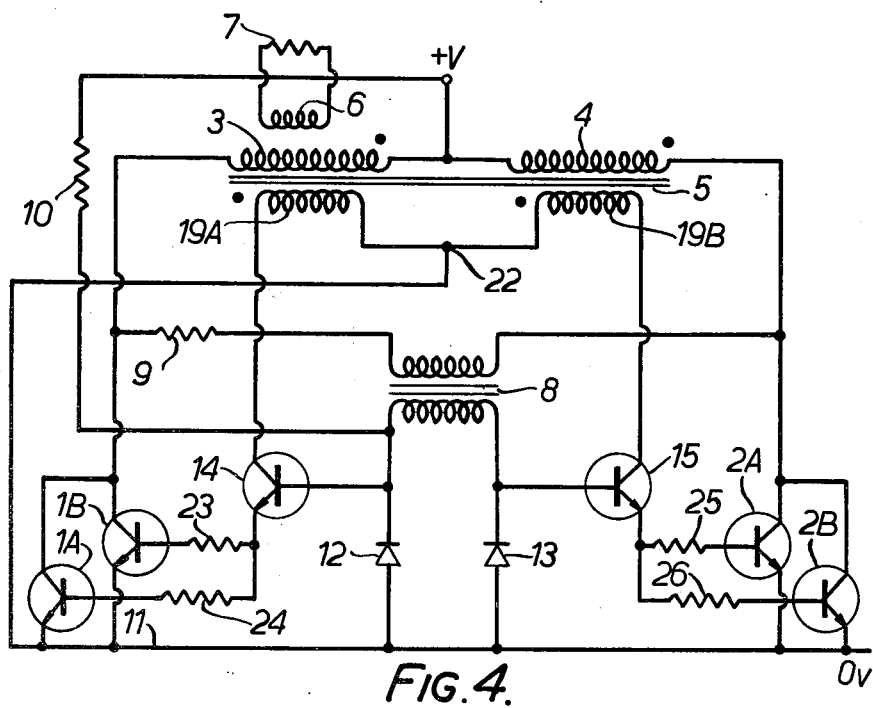

Referring to FIG. 4, in this embodiment, effectively the auxiliary winding 19 is supplied into two portions 19A and 19B the junction point 22 being connected to the common rail 11. This permits the diodes 20 and 21 of FIG. 3 to be dispensed with. However, this arrangement is not preferred in view of the added complexity of transformer 5 compared to the arrangment of FIG. 3.

In addition, FIG. 4 illustrates by way of example the requirement of each of the transistors 1 and 2 by a parallel pair of transistors 1A and 1B and 2A and 2B respectively.

Resistors 23, 24, 25 and 26 in the base circuit of transistors 1A, 1B, 2A and 2B are low value current sharing resistors.

Figure 5:
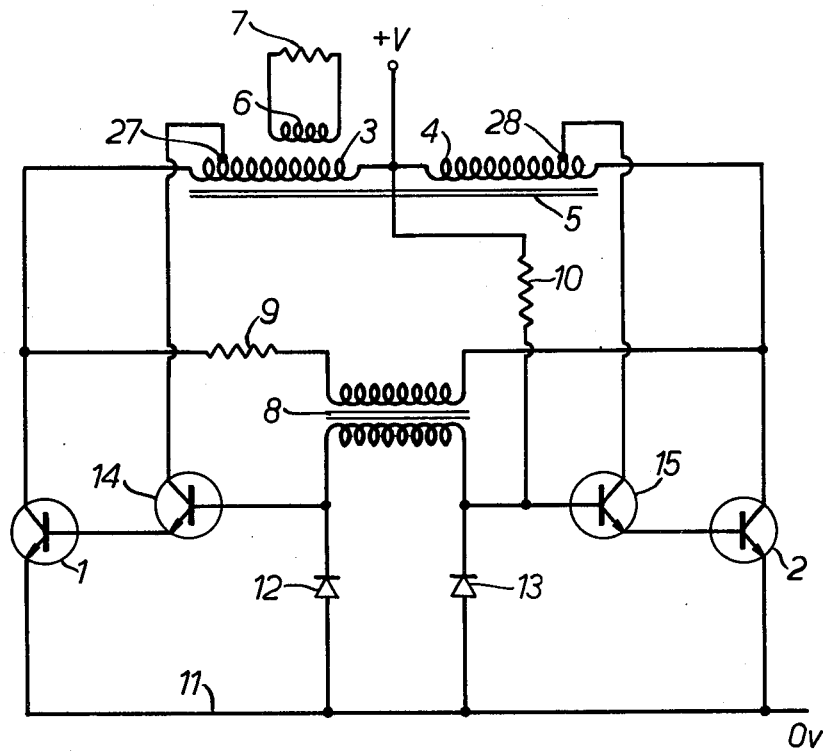

Referring to FIG. 5, in this example the general arrangement is similar to that of FIG. 4 except that once again single transistors 1 and 2 are used rather than the transistor pairs 1A, 1B and 2A, 2B and the individual windings 19A and 19B are in effect provided by tapping the existing windings 3 and 4 of transformer 5 at suitable points 27 and 28.

Whilst as described with reference to FIGS. 2 to 5 above, the transistors utilised are of the N.P.N. tupe, the invention is not limited to the use of transistors of this type.

I claim:

1. An inverter arrangment comprising an output transformer having a tapped primary winding, one portion of which provides a collector load for a first transistor and the other portion of which provides the collector load with a second transistor and a saturating transformer is arranged to provide oscillatory positive feedback from the collectors to the bases of said first and second transistors and wherein the feedback paths from said saturating transformer to said bases each includes the base emitter path of a respective additional transistor, means being provided for supplying current to the collectors of the additional transistors, whereby to maintain operation during saturation, and wherein said means comprises a resistive path from the collector of each additional transistor to a voltage supply point.

2. An inverter arrangement comprising an output transformer having a tapped primary winding, one portion of which provides a collector load for a first transistor and the other portion of which provides the collector load with a second transistor and a saturating transformer is arranged to provide oscillatory positive feedback from the collectors to the bases of said first and second transistors and wherein the feedback paths from said saturating transformer to said bases each includes the base emitter path of a respective additional transistor, means being provided for supplying current to the collectors of the additional transistors, whereby to maintain operation during saturation, and wherein said means comprises means for inductively coupling the collector electrodes of said two additional transistors to said output transformer.

3. An arrangement as claimed in claim 2 and wherein said inductive coupling means comprises means for connecting a tapping point on the respective portion of the primary winding of said output transformer to the collector electrode of the respective additional transistor.

4. An arrangement as claimed in claim 2 and wherein said inductive coupling means comprises two auxiliary windings, on coupled to one portion of the primary winding of the output transformer and the other coupled to the other, each auxiliary winding being coupled at one end to the other and at the other end to the collector or a respective one of the auxiliary transistors.

5. An arrangment as claimed in claim 2 and wherein said inductive coupling means comprises a single auxiliary winding coupled to the primary winding of said output transformer, one end of said auxiliary winding being connected to the collector of one of the auxiliary transistors and the other end of said auxiliary winding being connected to the collector electrode of the other of said additional transistors, the collectors electrodes of said additional transistors being referenced to common potential by means of suitably poled unilaterally conductive devices and the whole arrangement being such that during saturation said auxiliary winding provides just sufficient voltage to cause just sufficient current to flow as is necessary to drive said additional transistors.

6. An arrangement as claimed in claim 1 and wherein said first and second transistors are replaced by parallel connected pairs of transistors.

7. An arrangement as claimed in claim 3 and wherein said first and second transistors are replaced by parallel connected pairs of transistors.

* * * * *